United States Patent [19]

Corona et al.

[11] 4,413,903

[45] Nov. 8, 1983

[54] DOCUMENT ILLUMINATION SYSTEM

[75] Inventors: Stephen C. Corona, Rochester; Charles J. Urso, Jr., Webster, both of N.Y.

[73] Assignee: Xerox Corporation, Stamford, Conn.

[21] Appl. No.: 357,967

[22] Filed: Mar. 15, 1982

[51] Int. Cl.³ .............................................. G03B 27/74
[52] U.S. Cl. .......................................... 355/68; 355/1; 355/8
[58] Field of Search ........................... 355/67, 68, 8, 1; 136/247; 358/294

[56] References Cited

U.S. PATENT DOCUMENTS

| | | | |
|---|---|---|---|
| 3,926,518 | 12/1975 | Berry et al. | 355/8 |
| 4,017,180 | 4/1977 | Yen et al. | 355/68 |
| 4,124,294 | 11/1978 | Nakamura | 355/68 |
| 4,124,295 | 11/1978 | Gardiner | 355/68 |
| 4,128,329 | 12/1978 | Kawano | 355/68 X |
| 4,190,355 | 2/1980 | Avery et al. | 355/71 |
| 4,251,284 | 2/1981 | Oster, Jr. | 136/247 |
| 4,275,960 | 6/1981 | Habegger et al. | 355/68 |
| 4,371,897 | 2/1983 | Kramer | 358/294 |
| 4,383,758 | 5/1983 | Honda et al. | 355/68 |

*Primary Examiner*—Richard A. Wintercorn

[57] ABSTRACT

The invention discloses a document illumination assembly which combines the functions of enhanced document illumination and illumination level control. A reflector assembly is modified by introducing a light collecting mechanism within the reflector interior, the light collector being in association with a photosensing means. The reflector performs the normal function of reflecting a portion of the incident light toward the document to enhance illumination efficiency. The reflector also enables the additional function of monitoring the axial illumination of the illumination source by permitting an axial-located radiation band of illumination to enter the reflector body and propagate along the light collecting mechanism where it is sensed by the detector. The detector generates an output signal which can be used to control the output of the illumination source.

3 Claims, 6 Drawing Figures

DOCUMENT ILLUMINATION SYSTEM

BACKGROUND AND PRIOR ART STATEMENT

The present invention relates to a document illumination system and more particularly, to a system incorporating a control mechanism for regulating the light intensity of the illumination source.

In a typical document copier operation, a document lying on a platen is incrementally scanned by an illumination assembly and the reflected image is projected upon a photosensitive surface to form a latent image of the document. The latent image can then be developed and transferred to a copy sheet using well known xerographic techniques. A conventional illumination source is an elongated tubular device such as a fluorescent or tungsten lamp. The efficiency of this type of lamp is usually increased by positioning a reflector in close proximity to the lamp so as to increase the amount of illumination at the scanning slit. U.S. Pat. Nos. 3,926,518 and 4,190,355 disclose representative illumination systems.

A problem inherent in such lamp/reflector systems is the variation in emission of the lamp. Lamp output deteriorates with extended use and the surface can become dirty, impairing emission quality. These emission variations have an adverse affect on image exposure at the photosensitive surface, and, ultimately, of the output copy. Various techniques for compensation for these problems are known to the art. For example, U.S. Pat. Nos. 3,926,518 and 4,017,180 disclose the use of photodetectors on the image side of the projection lens. These photodetectors sample exposure illumination levels and feed back appropriate signals to control the power to the illumination source. A drawback to these types of control systems is that the photodetectors lie along the optical path and interfere, to some extent, with exposure levels.

This problem is met, for some systems, by having the photodetector sense light emissions at some point in proximity to the illumination source but out of the optical path. U.S. Pat. Nos. 4,124,295 and 4,124,294 are representative of two such systems. These systems still have a disadvantage shared by the image side detector systems. Because of the physical limitation (size) of the photodetector, only a small portion of the lamp would normally be viewed. Many lamps, particularly fluorescent types, exhibit variations in the axial illumination profile, (i.e. changing of control points due to mercury migration) and the relatively small area monitored by the detector may not be truly representative of the total or average lamp output.

It is therefore desirable to utilize a photodetector in the direct viewing area of a lamp which will provide an output signal representative of the illumination output along the entire axis of the lamp. According to the invention, this object has been realized by modifying the reflector assembly associated with the lamp so that it performs two functions. The reflector is constructed with a light transmissive interior in optical communication with a photodetector. An axial strip of illumination emitted from the lamp is permitted to enter the reflector interior via a clear axial "window" formed within the reflecting surface. While most of the illumination incident on the reflector is reflected towards the object plane scanning strip, a small portion is sampled and integrated within the reflector interior to provide an average illumination output at the photodetector. The output signal generated by the photodetector can then be compared with a reference signal to maintain the lamp current at a desired value.

The invention then, is related to an illumination system for controlling the illumination of a document in an object plane, the system comprising at least one linear illumination source disposed adjacent to said object plane, an elongated reflector assembly associated with the illumination source and positioned with respect to said source such that at least a portion of the emitted light is directed toward, and is reflected from, the facing portion of said assembly to said object plane, said reflector assembly comprising: a light transmitting interior body, a reflective coating on the surface of said body, said coating having longitudinally extending aperture therethrough along that surface of the assembly or series of apertures or openings directly illuminated by said illumination source whereby a portion of said direct illumination enters into said body, and at least one photosensor in operative association with said body to detect light entering the body through said aperture and propagating along the interior surface, said photosensor adapted to generate output illumination signal for use in controlling said illumination source lens.

In a specific embodiment, the light transmitting aperture on the reflector surface is shaped to purposely weight the signal to compensate for known system profiles. Various preferred materials are also provided which efficiently guide the incident illumination onto the photodetector. A preferred material is a plastic doped with a fluorescent dye. The advantages of this type of material as light collectors have been disclosed in publications such as U.S. Pat. No. 4,251,284 (a solar collector) and in copending U.S. application Ser. No. 257,694 filed on Apr. 27, 1981 now U.S. Pat. No. 4,371,897 issued Feb. 1, 1983, assigned to the same assignee as the present invention.

DRAWINGS

Figure 1:
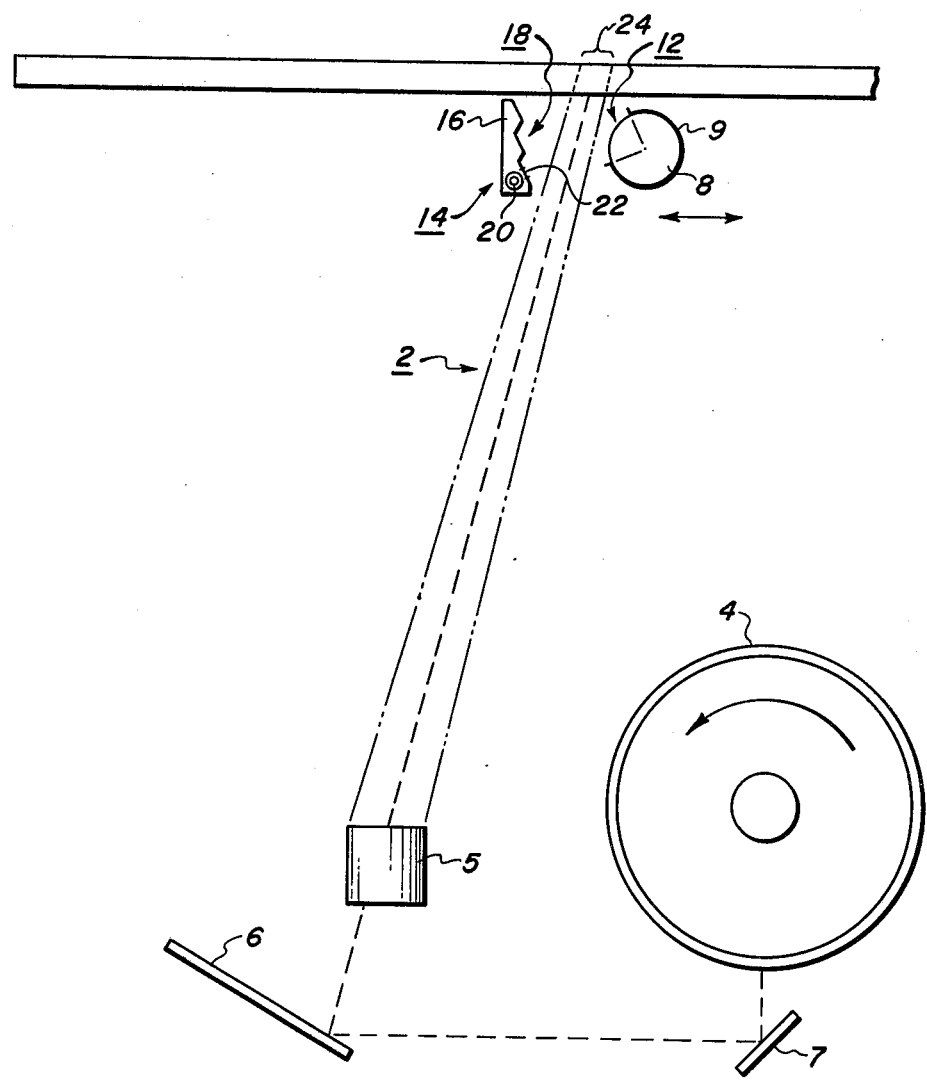
FIG. 1 is a schematic diagram of a document reproduction system utilizing the illumination system of the invention.

Referring now to FIG. 1, a scanning illumination system for a photocopier is indicated generally at 2 and includes a platen 3 disposed in an object plane, a photoreceptor drum 4, disposed in an image plane, a projection lens 5 located between the object and image planes, and first and second mirrors 6 and 7 to fold the optical system. A linear scanning lamp 8 located immediately beneath the platen is a tubular lamp whose length extends across the appropriate portion of the platen (into the plane of the page). In an exemplary embodiment, lamp 8 is a fluorescent lamp which includes a reflective coating 9 on the lamp envelope. The coating is omitted from a portion of the envelope so that a clear longitudinal aperture 12 is formed permitting the illumination to be transmitted towards the reflector and the platen. A facetted reflector 14 set is positioned so as to face the light aperture 12 of lamp 8. Reflector 14 can be mounted to move coextensive with lamp 8 in the direction shown by the arrows (by means not shown) or platen 3 can be moved while the lamp and reflector remain stationary. Lamp 8 and reflector 14 are located so that they are on opposite sides of an instantaneous strip scan area 24.

Reflector 14 consists of a plexiglass body 16 whose surface is covered with a reflector coating 18. A photodetector 20 is placed in optical communication with the interior of body 16 for purposes to be described in further detail below. The reflective coating 18 is omitted from a portion of the reflector surface to form a clear aperture 22.

In operation, an original document (not shown) is placed on top of platen 3. Lamp 8, in a timed relation with drum 4, scans platen 3 while reflector 14, moving coextensively with the lamp, directs reflected light towards scan slit 24. A flowing light image of the original document is then projected through lens 5 as a electrostatic latent image on the surface of drum 4.

Figure 2:
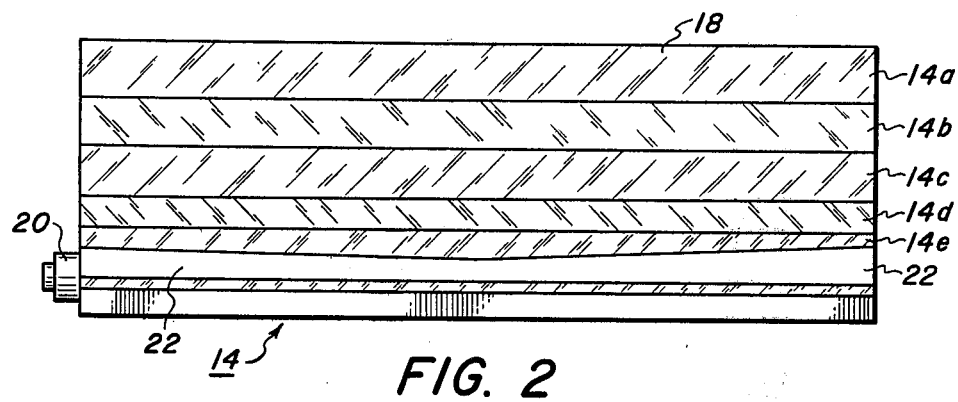
FIG. 2 is an axial view of the reflector assembly shown in end view in FIG. 1.

Referring now to FIG. 2, there is shown a front view of reflector 14. As shown, each facet 14a, 14b, 14c, and 14e are completely covered with reflective coating 18. This coating can be of a specularly reflective material such as aluminum. Facet 14e however, is only partially coated leaving an uncoated, axial strip 22 to serve as the entrance window to incoming radiation from the lamp. According to the construction of reflector 14, facets 14a–14e are designed so as to direct all incident light towards scanning slit 24. The relatively small sample of light enters reflector body 16 through aperture 22. Body 16 can consist of an optically transmissive plastic material such as plexiglass. The incident radiation is reflected from the interior surface of the reflector and scattered at sufficiently large angles so as to propogate along the length of the reflector body. The light is collected at one end by photodetector 20 which is in optical communication with the interior. Detector 20 is therefore sampling the average axial illumination for lamp 12 and generates a signal representative of this level. This signal is transmitted via a feedback circuit (not shown) and used to regulate lamp 12 current, which, in turn, controls lamp output.

It is to be noted that the uniformity of the radiation incident on detector 20 is dependent on the characteristics of the particular lamp and of the reflector body material. For the fluorescent lamp used in the FIG. 1 embodiment, the axial illumination profile of the lamp will show a drop-off in illumination at both ends of the lamp. Aperture 22 could then assume the configuration shown in FIG. 3A so as to "weight" the detector output signal by permitting a greater amount of light to enter the rod interior at both ends.

A second problem is introduced by the fact that the detector is "seeing" the sum of a plurality of light levels, each sum differing from the other in relation to the distance from the detector at their entrance point. Light incident in close proximity to the detector provides a higher signal than a signal incident at the end opposite to the reflector. An aperture shaped as shown in FIG. 3b would therefore "weight" the detector output by permitting a greater amount of light to enter the rod at the opposite end.

Figure 3A:
FIGS. 3a and 3b show aperture shapes through which light enters the interior of the reflector assembly.
Figure 3B:
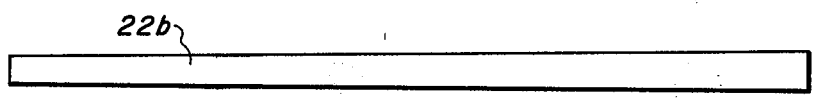

The aperture shown in FIG. 2 is a composite of FIGS. 3a and 3b and thus serve to compensate for both of these identified problems.

Figure 4A:
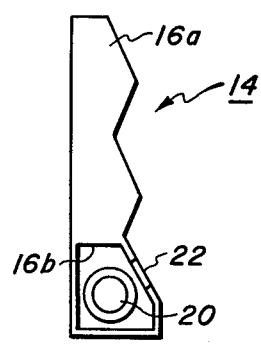
FIGS. 4a and 4b show alternate reflector embodiments.
Figure 4B:
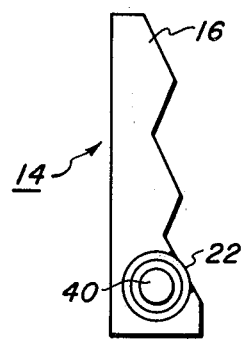

The physical construction of body 16 can take several forms depending upon the particular structure of the reflector assembly. For the FIG. 1 and 2 embodiment, instead of the entire interior surface being used to propogate the entering light, the top half 16A could be filled with an opaque substrate having a diffusely reflective interior surface 16B as shown in FIG. 4a. Or, alternatively, as shown in FIG. 4b, a tubular abutting rod 40 could be positioned with an entrance surface adjacent the aperture 22. Rod 40 can be coated with a diffusely reflective material save for the entrance aperture. A particularly efficient material for a rod would be a plastic doped with a fluorescent material. Several suitable materials are disclosed in aforementioned application Ser. No. 257,694. The operation of either of the FIG. 4a, 4b embodiments can be enhanced by placing a mirror or another photodetector, at the end opposite the detector 20.

For any of the above embodiments, the particular light collecting material can easily incorporate a mounting base for the photodetector. Alternatively, the detector can be optically connected to the reflector interior by means of a fiber optics coupling.

We claim:

1. An illumination system for controlling the illumination of a document in an object plane, the system comprising:
   at least one linear illumination source disposed adjacent to said object plane,
   an elongated reflector assembly associated with the illumination source and positioned with respect to said source such that at least a portion of the emitted light from said source is directed toward, and is reflected from the facing portion of said assembly to said object plane, said reflector assembly comprising:
   a light transmitting interior member,
   a reflective coating on the surface of said member, said coating having a longitudinally extending aperture therethrough along the surface of the assembly directly illuminated by said illumination source whereby a portion of said direct illumination enters into said member through said aperture, and
   at least one photosensor in operative association with said member to detect light entering the member through said aperture and propagating along the interior surface, said photosensor adapted to generate output illumination signals for use in controlling the light output of said illumination source.

2. The illumination system of claim 1 wherein said interior member comprises a fluorescent rod.

3. The illumination system of claim 1 wherein said aperture is adapted to provide constant sensitivity to light along its axial plane by shaping said aperture.

* * * * *